Oct. 14, 1930.  W. B. BURKE  1,778,183
TIRE REPAIRING UNIT AND PROCESS
Filed March 29, 1926

INVENTOR.
Wilbur B. Burke.
BY
Fay, Oberlin & Fay
ATTORNEYS.

Patented Oct. 14, 1930

1,778,183

UNITED STATES PATENT OFFICE

WILBUR B. BURKE, OF CLEVELAND, OHIO, ASSIGNOR TO THE ELECTRIC VULCANIZING RUBBER COMPANY, OF CLEVELAND, OHIO, A CORPORATION OF OHIO

TIRE-REPAIRING UNIT AND PROCESS

Application filed March 29, 1926. Serial No. 98,371.

This invention, relating, as indicated, to tire repairing units, consists more particularly in an adaptation or development of the novel method of electrically vulcanizing rubber described and claimed in United States Letters Patent No. 1,375,360 granted to me April 19, 1921. Among the objects of the invention are the provision of an element of the size desired for any particular repair job in a tire casing or like article made of vulcanized rubber, combined with an arrangement for the application of a heating current at the most effective points. Other objects will appear as the description proceeds.

To the accomplishment of the foregoing and related ends, the invention, then, consists of the means and procedure hereinafter fully described, and particularly pointed out in the claims, such disclosed features constituting, however, but one of various forms in which the principle of the invention may be used.

In said annexed drawing:—

Figure 1:
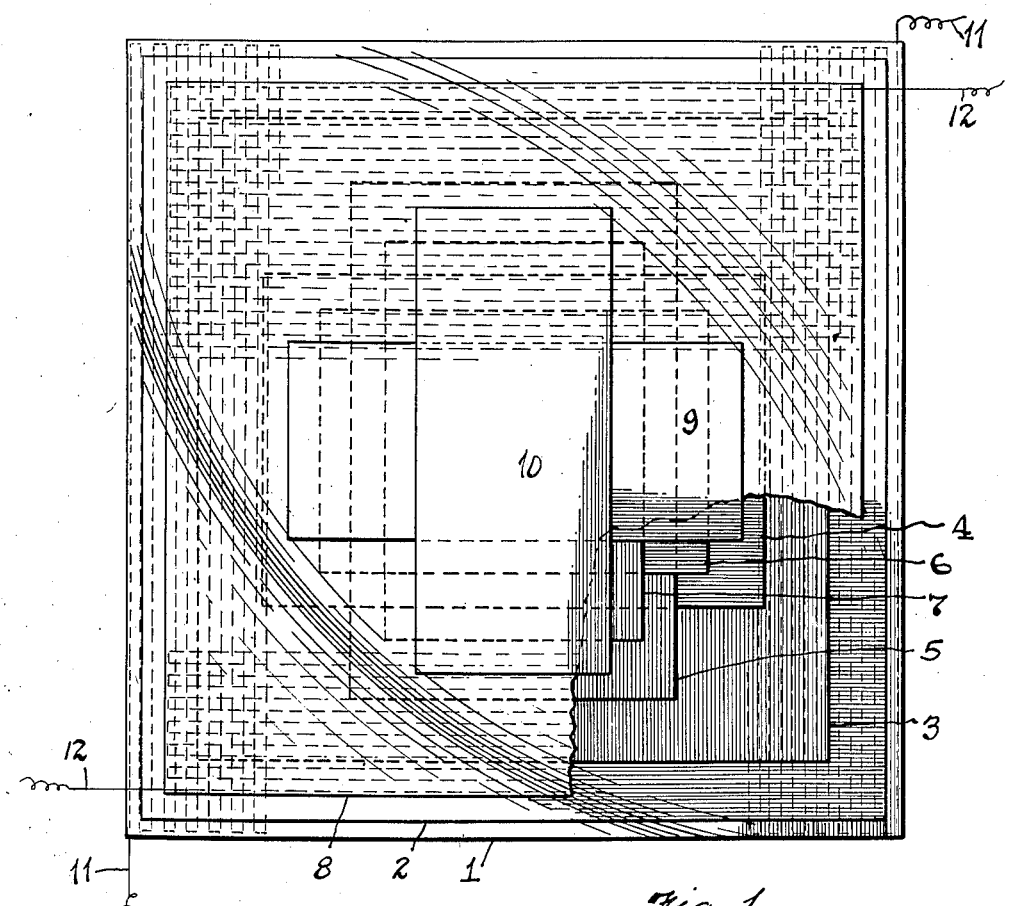
Figure 2:
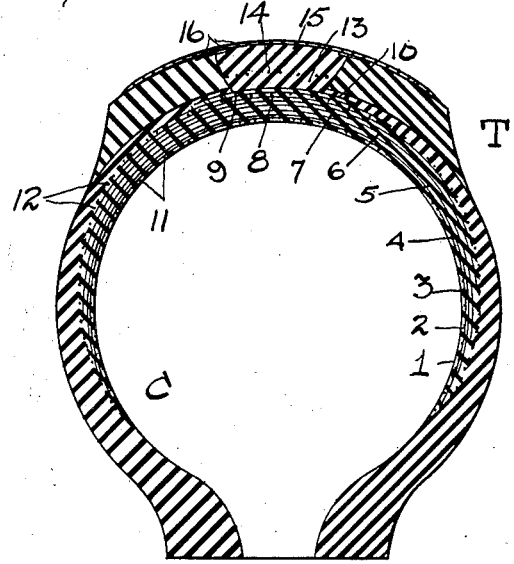

Fig. 1 is a plan view of a construction embodying my invention; and Fig. 2 is a sectional view with a tire assembly.

As shown in the drawing, the repair unit here contemplated is more especially adapted for use on the interior of a tire shoe (although as indicated above, it may be applied to any equivalent article), and it is made up of gummed fabric or equivalent textile usually in graduated widths adhered in assembly, for instance, rubber coated fabric (preferably cord), the layers being furthermore, but not necessarily, crisscrossed or placed at an angle with respect to each other, the vulcanizable rubber serving to hold them in relation until vulcanized.

As in the example shown in Fig. 1, there may be a larger layer 1 on which is in turn a smaller layer 2 and progressively smaller layers 3, 4, 5, 6, 7, 9 and 10, respectively. The layer 1 preferably is made up of two films or thin sheets of vulcanizable rubber between which is placed a heating wire having terminals 11, 11, and which is of suitable dimension to provide the heat necessary for vulcanization. In the form shown, another layer 8 similarly of vulcanizable rubber with a heating wire positioned within it having terminals 12, 12, is of such size as to cover a large part of the exposed area of the assembled layer structure, and then upon such layer 8 there may be placed layers 9 and 10. These latter as well as layers 2 to 7 inclusive are of rubber coated fabric or cord or cord fabric as may be preferred, and the entire assemblage thus comprises a heating means together with the vulcanizable elements of size chosen in accordance with the needs in any particular case.

If for instance, the use in view is for application to a tire which has been damaged along the tread section, the layers of the tire carcass C (see Fig. 2) will ordinarily be skived down more or less, and the assembly of vulcanizable material and heating wires as above described is positioned within the tire, the whole being suitably supported from within. Where there is more or less of a cavity to be filled exteriorly, this may be filled with a layer, for instance, of cushion rubber composition 13 and another heating wire 14 may be placed thereover, then a further layer of cushion rubber composition 15 and, finally, an outside gum layer 16 and associated heating wire, uniform pressure being applied usually by an external mold (not shown) or in other suitable manner.

The terminals of the heating elements are connected to a source of current; for instance, the terminals 11 and 12 at one end, the wires being then connected in series and current of suitable character is passed therethrough to accomplish the deep vulcanization. At the same time, or in case of extensive damage if preferred subsequently, the heating wires 14 and 16 may similarly be supplied with current to finish the vulcanization outside.

Since, as will be seen, the arrangement here provided allows of the application of the heat to the precise zones where it is required, the heating wire being distributively arranged coextensive with a substantial portion of the vulcanizable material, vulcanization of deeply placed material can be readily accomplished without at the same time overcuring adjacent zones of the tire body, and this makes possible the treatment of tire shoes of extreme thickness either in new or repair work in a manner and to a degree that has not been heretofore attained. For instance, large size tires for bus and truck use can be readily vulcanized at the inside and without damage to portions which it is not desired to further vulcanize. In fact, by selecting the number of layers in accordance with the work in view, new or old, and by placing the heating wires in the assembly at levels allowing of distribution of the heat to the particular layers intended to be vulcanized, the whole can be securely vulcanized in position, and the wires used for heating are ultimately of further advantage in that they provide a re-enforcement to the vulcanized structure.

It will furthermore be noted that the associated electric resistance heating elements approach more closely adjacent the periphery of the repair unit, and this is a distinct advantage in that the heat generated therein is thus most effectively distributed. In other words such heat is most concentrated where the loss by conduction is the greatest, and as a result the uniform vulcanization of the repair unit is obtained.

Other modes of applying the principle of my invention may be employed, provided the means and steps stated by any of the following claims or the equivalent of such stated means and steps be employed.

I therefore particularly point out and distinctly claim as my invention:—

1. A tire-repairing unit, comprising a vulcanizable layer conformable to a segmental portion of a tire and a plurality of rubberized textile reenforce layers of graduated size, and combined wire-reenforce and self-contained internal heating means including electric resistance heating wires interposed therein.

2. A tire-repairing unit, comprising a vulcanizable layer conformable to a segmental portion of a tire and a plurality of rubberized textile reenforce layers of graduated size, and combined wire-reenforce and self-contained internal heating means including electric resistance heating wires interposed therein, said wires approaching more closely together where adjacent the periphery of the unit.

3. A tire-repairing unit, comprising a vulcanizable layer conformable to a segmental portion of a tire and a plurality of crisscrossed cord layers adhered in assembly by vulcanizable rubber, said layers being of graduated size, and combined wire-reenforce and self-contained internal heating means including electric resistance heating wires interposed therein and distributively arranged coextensive with a substantial portion thereof.

4. A tire-repairing unit, comprising a vulcanizable layer conformable to a segmental portion of a tire and a plurality of crisscrossed textile-reenforce layers adhered in assembly by vulcanizable rubber, said layers being of graduated size, and combined wire-reenforce and self-contained internal heating means including electric resistance heating wires interposed therein and distributively arranged near the surfaces of said assembly.

5. A process of the character described, which comprises applying to a segmental portion of the circumference of a tire a plurality of textile and vulcanizable rubber layers of graduated size and combined wire-reenforce and self-contained internal heating means including an electric wire distributively arranged within said layers and near the surface adjacent to the tire, and selectively generating heat in such segmental assembly without heating the remaining circumference of the tire by passing a current through such heating wire, while applying pressure.

6. A process of the character described, which comprises skiving back a segmental portion of the circumference of a tire, applying a plurality of crisscrossed cord and vulcanizable rubber layers of graduated size, and combined wire-reenforce and self-contained internal heating means including an electric heating wire distributively arranged within said layers, and selectively generating heat in such segmental assembly without heating the remaining circumference of the tire, by passing a current through such heating wire, while applying pressure.

7. A process of the character described, which comprises skiving back a segmental portion of the circumference of a tire, applying a plurality of crisscrossed textile and vulcanizable rubber layers of graduated size, and combined wire-reenforce and self-contained internal heating means including an electric heating wire distributively arranged within said layers, applying vulcanizable cushion rubber and a distributively arranged electric heating wire at the outside of a tire opposite the layers of crisscrossed textile, and selectively generating heat in such segmental assembly without heating the remaining circumference of the tire, by passing a current through said wires, while applying pressure.

Signed by me this 26" day of March, 1926.

WILBUR B. BURKE.